United States Patent [19]

Zimmermann et al.

[11] 3,752,896

[45] Aug. 14, 1973

[54] METHOD AND APPARATUS FOR JOINING THE ELECTRODES OF AN ELECTROSLAG REMELTING SYSTEM

[75] Inventors: Erich Zimmermann, Hattingen-Blankenstein; Nikolaus Forster, Dortmund-Brackel, both of Germany

[73] Assignee: Rheinstahl Huttenwerke AG, Essen, Germany

[22] Filed: Sept. 19, 1972

[21] Appl. No.: 290,371

[30] Foreign Application Priority Data

Oct. 16, 1971 Germany.................. P 21 51 617.6

[52] U.S. Cl. ...................... 13/18, 13/34, 219/69 E
[51] Int. Cl. ............................................. H05b 7/10
[58] Field of Search .................. 13/18, 9 ES, 14–17, 13/34; 219/69 E, 119, 120, 145, 146

[56] References Cited
UNITED STATES PATENTS

| 2,845,293 | 7/1958 | Peckham, Jr. ...................... 13/18 X |
| 3,400,206 | 9/1968 | Barth .............................. 219/145 X |

Primary Examiner—Roy N. Envall, Jr.
Attorney—John J. McGlew et al.

[57] ABSTRACT

A method for joining the electrodes for electroslag remelting comprises arranging the electrodes in a feeding position in which they are fed downwardly one above the other relative to an ingot to be remelted and welding at least the core regions of the two electrodes together by subjecting them to currents of high intensity. An electrode feeding device comprises a vertical stand with first and second electrode holders on the stand which are independently vertically movable thereon. Each holder is insulated from the associated stand and from each other and from ground and it is provided with clamping means for clamping an electrode in a position in which its axis extends substantially vertically above the ingot to be remelted. During operation, the holders are moved vertically such that the electrode held by the uppermost holder is positioned into abutting contact with the top of the electrode held by the lowermost holder. The apparatus also advantageously includes a centering, packing and insulating ring which surrounds the space between the two abutting electrodes and which may advantageously be made with a funnel-shaped upper portion which may be filled with a slag.

12 Claims, 3 Drawing Figures

METHOD AND APPARATUS FOR JOINING THE ELECTRODES OF AN ELECTROSLAG REMELTING SYSTEM

BACKGROUND OF THE INVENTION

1. Field of the Invention

This invention relates in general to a method and apparatus for welding and, in particular, to a new and useful method for joining the electrodes for electroslag remelting when they are in a feeding position during the remelting, and wherein the electrodes are welded together, and to an improved apparatus therefor.

2. Description of the Prior Art

The problem of changing electrodes in the remelting of electroslags has not been solved satisfactorily as of now. In the usual method, the molten electrode is replaced as soon as possible by a new one by means of feeding and holding devices for the electrodes. With such devices, however, a temporary interruption during the remelting of the last electrode is unavoidable. In addition, the slag is cooled during the introduction of the new electrode and this can lead to changes in the structure of the ingot. In order to avoid this, the slag is heated during the change of the electrodes by the use of an additional or auxiliary electrode, or the new electrode is preheated.

It is, of course, possible to use a single or very long electrode which will produce the entire ingot so that there will be an undisturbed melting process. Generally speaking, however, the overall height which is available will not permit this particularly for large ingots. Because the electrode generally has a smaller cross-section than the ingot, it has also been tried to connect one electrode during the melting with a second electrode with a ring-shaped welding wire which is arranged at the edge of the electrodes. In order to prevent the electrode parts from falling into the liquid melt during the conical melting of the electrode when the joint weld dissolves in the slag, and which will cause structural disturbances, the tip of the electrodes are made conical and the ends of the electrodes are provided with a corresponding conical recess and with a further recess to receive the marginal weld to be produced by the electric welding. With this method, it is necessary to machine the electrode ends prior to their use and it is difficult to handle the electrodes because of the formation of the electric welds while the electrode is in use, particularly since the electric welds must have a sufficiently large cross-section so that they will not break open by heating which would cause the bottom electrode to fall off during the transfer of current in the remelting of the electroslag.

SUMMARY OF THE INVENTION

In accordance with the present invention, a method and apparatus is provided, which insures that the usual machined electrodes can be safely joined with each other without great costs and in a manner such that the joint will withstand the current load and the electrode parts will not separate and fall into the sump of the remolten ingot. With the present invention, this problem is solved in a method in which the two electrodes are joined for the remelting of the electroslag while they are in a feeding position and during the remelting and by welding at least the core regions of the two electrodes together using current of high intensity. The welding of the core regions using high current intensities yields a rapidly produced large surfaced joint between the two electrodes which can absorb the high current densities of the remelting process without undue heating, and which holds the electrode safely to its end during the conical remelting of the rest of the bottom electrode because the electrodes are joined together in their centers.

The welding of the two electrodes with high current densities is effected best by pressing them against each other and by carrying out a flash-butt welding. The welding may also be carried out by means of an electroslag remelting. In both methods, the current available in the chill mold for the remelting of the electroslag can be used for joining the electrodes together. It is possible to work with an auxiliary current source also.

When using electrodes having very large diameters, they are generally provided with a journal which is cast or forged on the end of the upper electrode to keep the clamping device, which is necessary for supporting the electrode, to much smaller dimensions than would normally be required. Such end journals, which are tapered with regard to the rest of the electrode diameter, are of particular advantage for the method of the invention because they ensure a very uniform welding due to the smaller contact surface with the counter-electrode which is required.

An apparatus for the invention includes an electrode feeding device which comprises a vertical support or stand which carries two vertically spaced electrode holders wich can be moved upwardly and downwardly relative to the holder and relative to each other. Each holder includes means for clamping an electrode therein and the electrodes are insulated from the other holder and from the ground and they are provided with quick opening and closing clamping means. The lower holder includes clamping means for engaging and clamping the operating electrode which is introduced into the molten pool of the ingot or mold and the upper electrode is held in position by the upper clamp or holder so that it may be moved axially relative to the first electrode. By the provision of the electrical insulation of the holders in respect to each other, it is possible to eliminate the welding current which is supplied from the current source of the ESU plane by one electrode holder through the weld, and by the second electrode holder through the weld. It is also possible to supply the current over the upper electrode holder and to eliminate the current to the ingot which is to be remelted. The weld and the point at which the remelting of the electrode slag takes place are then connected in series.

The welding of the electrodes may be carried out in accordance with flash-butt welding techniques and, in such a case, it is advantageous to make the support and the electrode holders and the drive for the electrode holders very strong. The weight of the upper electrode helps to produce the necessary contact welding pressure downwardly on the top of the lower electrode. Particularly with electrodes of large cross-sections, the start of the welding process can be accelerated by briefly lifting the upper electrode after contact with the lower electrode in order to produce an electric arc. It is advantageous to provide the lower electrode with a centering, packing and insulating device in the form of a ring which may advantageously have its upper end outwardly flaring or funnel-shaped. This facilitates the central attachment of the upper electrode to the bottom electrode and protects the holding device against liquid welding material and ensures that the welded joint will remain warm when the two electrodes are welded together.

When the electrodes are welded together by means of the electroslag remelting method, the device is provided with a short intermediate chill mold with the upper funnel-shaped portion and which includes a lower portion of a diameter slightly larger than the diameter of the electrode. The intermediate mold is electrically insulated on the support therefor and it can be moved vertically coaxially to the electrodes. The welding of the two electrodes is effected by starting a second electroslag remelting process in the intermediate mold in order to form a melt sump and, after the formation of the melt sump, the upper electrode is dipped into the sump in order to interrupt the melting and to start the welding. The two electrode slag remelting zones which are formed, one in the intermediate mold, and one in the main mold below the first electrodes, can be connected in series electrically or they can be operated electrically independently of each other. With this device, the two electrodes can be welded with each other over their entire surfaces without pressure.

Accordingly, it is an object of the invention to provide an improved method for joining the electrodes for electroslag remelting while they are in a feeding position for the electrodes and during the remelting and wherein at least the core regions of the two electrodes are welded together by applying currents of high intensity to the electrodes.

A further object of the invention is to provide a method of joining two electrodes together which comprises arranging them in a feeding position on separate holders with their axes aligned and with one above the other, directing the lowermost one into the ingot and applying a current thereto in order to melt the ingot and, while the current is still applied to the first ingot, lowering the second uppermost ingot into abutting contact with the lowermost, and welding it to the lowermost ingot by lifting it above the lowermost ingot to form an arc or by forming a melt around the abutting first and second ingots which may be advantageously filled with a slag and contained within a container located around the ingots between the abutting areas thereof.

A further object of the invention is to provide an apparatus for feeding electrodes which comprises a vertical stand having first and second vertically movable electrode holders thereon which are adapted to be arranged over an ingot and which each include clamping means for clamping a separate ingot with the upper holder being movable relative to the lowermost holder in order to abut the upper electrode against the lower electrode and with each holder being insulated from each other.

A further object of the invention is to provide an apparatus for supporting electrodes for electroslag remelting and for joining the electrodes together during the remelting process which is simple in design, rugged in construction and economical to manufacture.

For an understanding of the principles of the invention, reference is made to the following description of typical embodiments thereof as illustrated in the accompanying drawings.

GENERAL DESCRIPTION OF THE PREFERRED EMBODIMENTS

Figure 1:
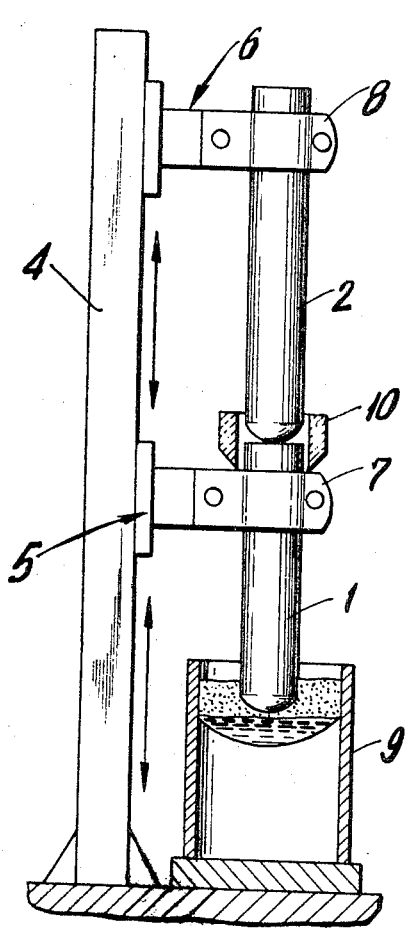
FIG. 1 is a side elevational view, partly in section, of an apparatus for the feeding of electrodes in an electroslag melting process.

In accordance with the method of the invention, two electrodes 1 and 2 are arranged in a feeding position in which they feed into a slag pool formed at the top of an ingot mold 9. In the inventive method, the core regions of the two electrodes are welded together at the abutting contact point between the top of the lowermost electrode 1 and the bottom of the uppermost electrode 2. The invention includes an apparatus for feeding the electrodes 1 and 2 vertically which includes a vertical stand 4, having two electrode holders 5 and 6, which are relatively movable thereon upwardly and downwardly independently. In the preferred arrangement, the electrode holders 5 and 6 may be moved independently relative to each other in a vertical direction over the full height of the stand 4. The two electrode holders 5 and 6 are insulated against each other and against the ground. They include quick closing clamping arms or clamping means 7 and 8, respectively.

When the melting process is started, the electrode 1, which is clamped at the lower electrode holder 5, is moved with the holder 5 downwardly toward the ingot mold 9. The electrode 1 is clamped so that the top edge projects above the holder 5. After the remelting process has begun in the ingot mold 9 and progresses to an extent in which the electrode 1 is moved downwardly as it is consumed, the next electrode 2 to be used is clamped into the upper electrode holder 6 which is arranged at its topmost position. Shortly before the electrode holder 5 reaches its bottom position, the electrode 2 is lowered sufficiently to cause the electrode to engage against the top of the electrode 1. The electrical current circuit to the electrode 1 and to ingot mold 9 is interrupted and the current source is applied to the electrodes 1 and 2 with a sufficiently high potential to cause the starting of a welding process between the two electrodes. The bottom end of the electrode 2 is slightly recessed so that the welding of the core region of the electrode of at least one fifth of the electrode diameter is ensured. Then the welding circuit is opened and the electrode 1 is connected to continue the remelting operation. After an adequate cooling of the joint weld, the clamping means 7 carried by the lower holder 5 is opened and the electrode holder 5 is moved up to the electrode holder 6 and the clamping means 7 thereon is closed around the newly positioned electrode 2. A clamping means 8 of the upper electrode holder 6 is opened and the electrode is advanced by the electrode holder 5 to continue the melting operation.

In order to be able to join the two electrodes 1 and 2 better before they are welded, and also to prevent overflowing of the welding material from damaging the clamping means 7 beneath the joints between the electrodes 1 and 2 when they are welded together, the invention provides a protection device in the form of a funnel-shaped insulated centering, packing and insulating device 10. The device 10 is in the form of a ring which extends around the electrodes 1 and 2 and is advantageously positioned to encompass the joint therebetween.

Figure 2:
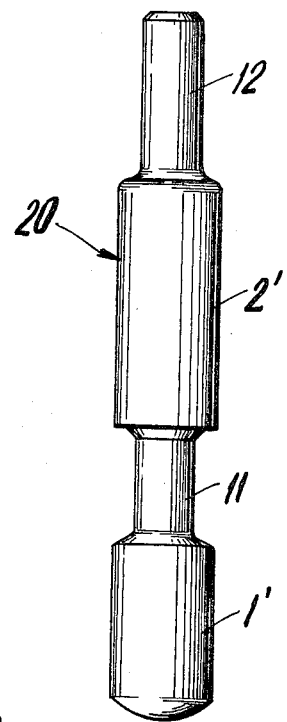
FIG. 2 is an elevational view of a combined electrode used for electroslag remelting.

In FIG. 2 there is indicated an electrode of a very large diameter, generally designated 20, and which includes a lower or first electrode portion 1' and an upper or second electrode portion 2' which are interconnected by a clamping journal 11 which has a smaller diameter than the electrodes in order to facilitate its being placed in the clamping devices 5 and 6. In addition, a further top journal 12 is provided at the upper end of the second electrode 2' in order to permit it to be clamped by the clamping device 6. When such electrodes are used in the electrode feeding devices, according to the arrangement shown in FIG. 1, the clamping journals 11 and 12 of the electrode 20 have a length which is at least equal to the distance of the bottom edge of the clamping means 7 from the upper edge of the clamping means 7 at the greatest approach of the two electrode holders 5 and 6. This is necessary so that the electrode can be transferred from one clamping means to the other.

Figure 3:
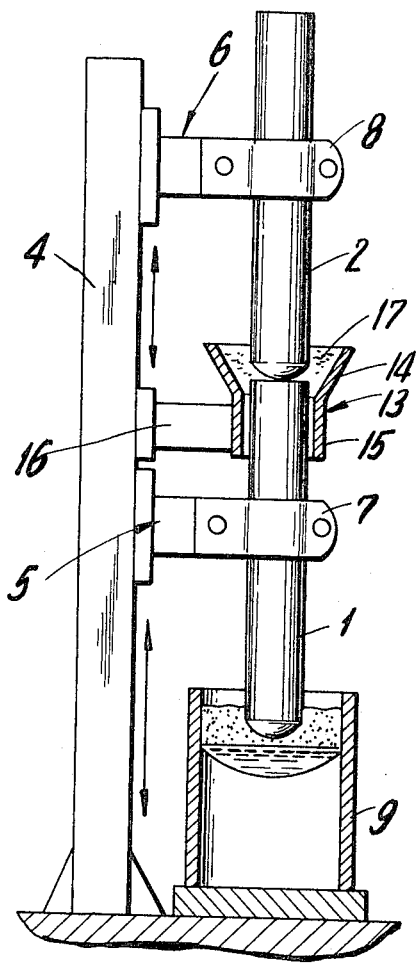
FIG. 3 is a view similar to FIG. 1 of another embodiment of the invention.

In the embodiment shown in FIG. 3, the apparatus includes the same devices shown in FIG. 1 but also includes an intermediate mold 13 which is carried on a holder 16 which is also movable on the stand 4. The intermediate mold 13 includes an upper funnel-shaped part 14 and a lower part 15 having an inside diameter which is substantially the same as the diameter of the electrodes 1 and 2.

With the apparatus of FIG. 3, the welding of the two electrodes 1 and 2 is effected as follows:

When the electrode 1 melts down, it is pulled by the descending electrode holder 5 through the mold 13 while the mold 13 is being moved downwardly but at a slower rate. When the end of the electrode 1 has arrived in the funnel-shaped portion 14 of the mold 13, the electrode holder 5 and the mold holder 16 are moved downwardly at the same speed. The funnel-shaped part 14 of the mold 13 is filled with a slag 17 and the electrode 2 is lowered by means of the electrode holder 6 until it comes into contact with the electrode 1. The current which is supplied is switched from the clamping means 7 for flow through the electrode 1 to the clamping means 8 for flow through the electrode 2. Then the electrode 2 is lifted slightly away from the electrode 1 and the voltage is increased in order to draw an arc. In this way, the electroslag remelting process is started in the intermediate mold 13. The two electroslag remelting zones in the intermediate mold 13 and in the ingot mold 9 are then connected in series. The voltage is increased and, after liquefaction of the slag 17, the movement of the mold holder 16 is stopped. Care must be taken during the remelting of the electrode 2 in the intermediate mold 13 to ensure that the liquid metal parts are contained only in the lower part 15 of the mold 13 in order to prevent any break-offs of the material.

After the formation of melt sump in the lower part 15 of the intermediate mold 13, the upper electrode is moved downwardly through the slag until it dips into the melt sump. The melting process of the electrode 2 is thus interrupted and the two electrodes 1 and 2 are welded together. During the uniform lowering of the electrode holders 5 and 6, the weld issues at the bottom from the mold 13. Then, after loosening of the clamping means 7, mold 13 and electrode holder 5 are moved upwardly and the clamping means 7 is closed. The current supply is switched from the clamping means 8 to the clamping means 7 and the clamping means 8 are loosened. In order to accelerate the solidification, the current supply can also be switched from clamping means 8 to the clamping means 7 at the end of the melting process so as to not stress the solidifying weld by the current for the electroslag remelting process in the mold.

While specific embodiments of the invention have been shown and described in detail to illustrate the application of the principles of the invention, it will be understood that the invention may be embodied otherwise without departing from such principles.

What is claimed is:

1. A method for joining the electrodes which are fed into association with an ingot within an ingot mold comprising arranging a first and second electrode in a feeding position on which they extend substantially vertically above the ingot, feeding the lowermost electrode into engagement with the ingot in order to cause the melting thereof and welding the second uppermost electrode to the first electrode under high current intensity in order to joint together the two electrodes at least in the core regions.

2. A method according to claim 1, wherein the electrodes are welded with high current intensities by pressing them against each other to effect a flash-butt welding.

3. A method according to claim 1, wherein the two electrodes are welded together by means of electroslag remelting.

4. A method according to claim 1, wherein one of the electrodes has an end journal which is tapered with respect to the rest of the electrode diameter.

5. A method of electroslag remelting using a series of electrodes which are introduced into engagement with an ingot in an ingot mold comprising energizing a first electrode in order to cause it to melt the ingot and to be consumed into the melt of the ingot as it is moved toward the ingot, arranging a second electrode in axial alignment behind the first electrode and advancing it into contact with the first electrode and welding the second electrode to the first electrode as the first electrode is being consumed in the melt bath.

6. A method of electroslag remelting, according to claim 5, including putting a centering, packing and insulation means around the top end of the first electrode and a portion of the bottom end of the second electrode after it is in abutting engagement with the first electrode and maintaining the insulation means in position when the first electrode is welded to the second electrode.

7. A method of electroslag remelting, according to claim 6, wherein the insulation includes a small diameter portion and an upper outwardly flaring funnel portion and including applying a slag material into the funnel portion after initiating the welding.

8. A method of electroslag remelting, according to claim 5, wherein after the first electrode has been consumed to a predetermined amount and the second electrode is moved downwardly to engage its lower end against the top of the first electrode, the current supplied to the first electrode and the ingot is discontinued and it is applied instead to the first and second electrodes to start a welding process therebetween, and wherein the second electrode is moved upwardly off the first electrode to effect a flash-welding.

9. An electrode feeding device, comprising a vertical stand, a first electrode holder on said stand movable upwardly and downwardly thereon, a second electrode holder on said stand located over said first electrode holder and being movable upwardly and downwardly thereon, insulating means insulating each holder against said stand and against the ground, said first holder having a first clamping means for clamping an electrode in a position with its axis extending substantially vertically and above the ingot mold, said second electrode holder having second clamping means for holding a second electrode in a position with its axis substantially vertical and above the electrode carried by said first holder, said first and second holders being movable relative to each other to effect abutment of the upper electrode of the second electrode holder against the top of the lower electrode carried by the first electrode holder.

10. An electrode feeding device, according to claim 9, including a ring arranged around said first and second electrodes in the area of their abutting contact.

11. An electrode feeding device, according to claim 10, wherein said ring is made of an insulating material and it includes a lower portion extending around the lowermost electrode and an upper outwardly flaring funnel-shaped portion for receiving a slag.

12. An electrode feeding device, according to claim 9, wherein said first electrode includes first and second vertically spaced wide diameter portions with an intermediate portion of smaller diameter therebetween and including an upper portion of smaller diameter than said first and second portions, said intermediate and said upper portions comprising journal portions for engagement with said first and second holders, respectively, said upper smaller diameter portion being twice the length of said intermediate smaller diameter portion.

* * * * *